(12) United States Patent
Belghoul et al.

(10) Patent No.: US 9,622,289 B2
(45) Date of Patent: Apr. 11, 2017

(54) END-TO-END DELAY ADAPTATION WITH CONNECTED DRX IN A CELLULAR VOICE CALL

(71) Applicant: Apple Inc., Cupertino, CA (US)

(72) Inventors: Farouk Belghoul, Campbell, CA (US); Tarik Tabet, Los Gatos, CA (US); Syed Aon Mujtaba, Santa Clara, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 221 days.

(21) Appl. No.: 14/310,472

(22) Filed: Jun. 20, 2014

(65) Prior Publication Data
US 2015/0373774 A1 Dec. 24, 2015

(51) Int. Cl.
*H04W 76/04* (2009.01)
*H04L 12/26* (2006.01)
*H04L 12/24* (2006.01)

(52) U.S. Cl.
CPC ....... *H04W 76/048* (2013.01); *H04L 43/0858* (2013.01); *H04L 41/147* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 5,373,506 A * | 12/1994 | Tayloe | H04B 1/1615 370/311 |
| 8,169,957 B2 | 5/2012 | Damnjanovic | |
| 8,238,260 B2 | 8/2012 | Terry et al. | |
| 8,611,240 B2 | 12/2013 | Anderson et al. | |
| 2010/0113008 A1* | 5/2010 | Wang | H04L 1/20 455/423 |
| 2010/0142412 A1* | 6/2010 | Synnergren | H04L 29/06027 370/261 |
| 2012/0314635 A1* | 12/2012 | Lee | H04L 5/001 370/311 |
| 2013/0023275 A1 | 1/2013 | Mutya et al. | |
| 2013/0170415 A1* | 7/2013 | Fukuta | H04W 52/0216 370/311 |
| 2014/0073306 A1* | 3/2014 | Shetty | H04W 36/0088 455/418 |

* cited by examiner

*Primary Examiner* — Chirag Shah
*Assistant Examiner* — Joshua Smith
(74) *Attorney, Agent, or Firm* — Meyertons Hood Kivlin Kowert & Goetzel, P.C.; Jeffrey C. Hood

(57) ABSTRACT

End-to-end delay adaptation in conjunction with connected discontinuous reception (C-DRX) mode communication during cellular voice calls. A Voice over LTE (VoLTE) call may be established between a first wireless user equipment (UE) device and a second UE. End-to-end delay between real-time transport protocol (RTP) layers of the first UE and the second UE for the VoLTE call may be estimated. The end-to-end delay may be compared with one or more thresholds A C-DRX cycle length for the VoLTE call may be modified based on comparing the end-to-end delay with the one or more thresholds.

17 Claims, 10 Drawing Sheets

FIG. 14: | MAC | RLC | PDCP | IP | UDP | RTP | AMR | PDCP | IP | UDP | RTP | AMR |

FIG. 15: | MAC | RLC | PDCP | IP | UDP | RTP | AMR | AMR |

FIG. 16: | MAC | RLC | PDCP | IP | UDP | RTP | AMR | PDCP | IP | UDP | RTP | AMR | PDCP | IP | UDP | RTP | AMR |

FIG. 17: | MAC | RLC | PDCP | IP | UDP | RTP | AMR | AMR | AMR |

END-TO-END DELAY ADAPTATION WITH
CONNECTED DRX IN A CELLULAR VOICE
CALL

FIELD

The present application relates to wireless devices, and more particularly to a system and method for end-to-end delay adaptation with connected-mode discontinuous reception in a cellular communication system.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Techniques for providing voice call services via wireless communication, including cellular telephony, are widespread in use. There is currently movement towards packet-switched wireless communication techniques for voice call services. Such techniques remain imperfect, however, and improvements in the field would be desirable.

SUMMARY

Embodiments are presented herein of, inter alia, methods for providing end-to-end delay adaptation in conjunction with connected discontinuous reception (C-DRX) mode communication during cellular voice calls, and of devices configured to implement the methods.

According to the techniques described herein, a wireless device may monitor end-to-end delay of a packet-switched cellular voice call (such as a VoLTE call) with another wireless device. For example, the wireless device may estimate (at least once, and possibly multiple times, e.g., over the course of the call) the total end-to-end delay between real-time transport protocol (RTP) layers of the wireless device itself and the other party of the call, and compare that estimate with one or more threshold values.

Based on such monitoring, the wireless device may determine whether the current C-DRX cycle length used when communicating (transmitting and receiving) call data is appropriate. For example, if the end-to-end delay is higher than desirable (for instance, high enough to be noticeable to users and/or cause user dissatisfaction), the C-DRX cycle length may be decreased, which may reduce end-to-end delay for subsequent communications. If, on the other hand, end-to-end delay is very low, the C-DRX cycle length may be increased, which may reduce power consumption by the wireless device.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIGS. 14-17 illustrate exemplary audio packet formats according to various aggregation and DRX cycle length scenarios.

Figure 1:
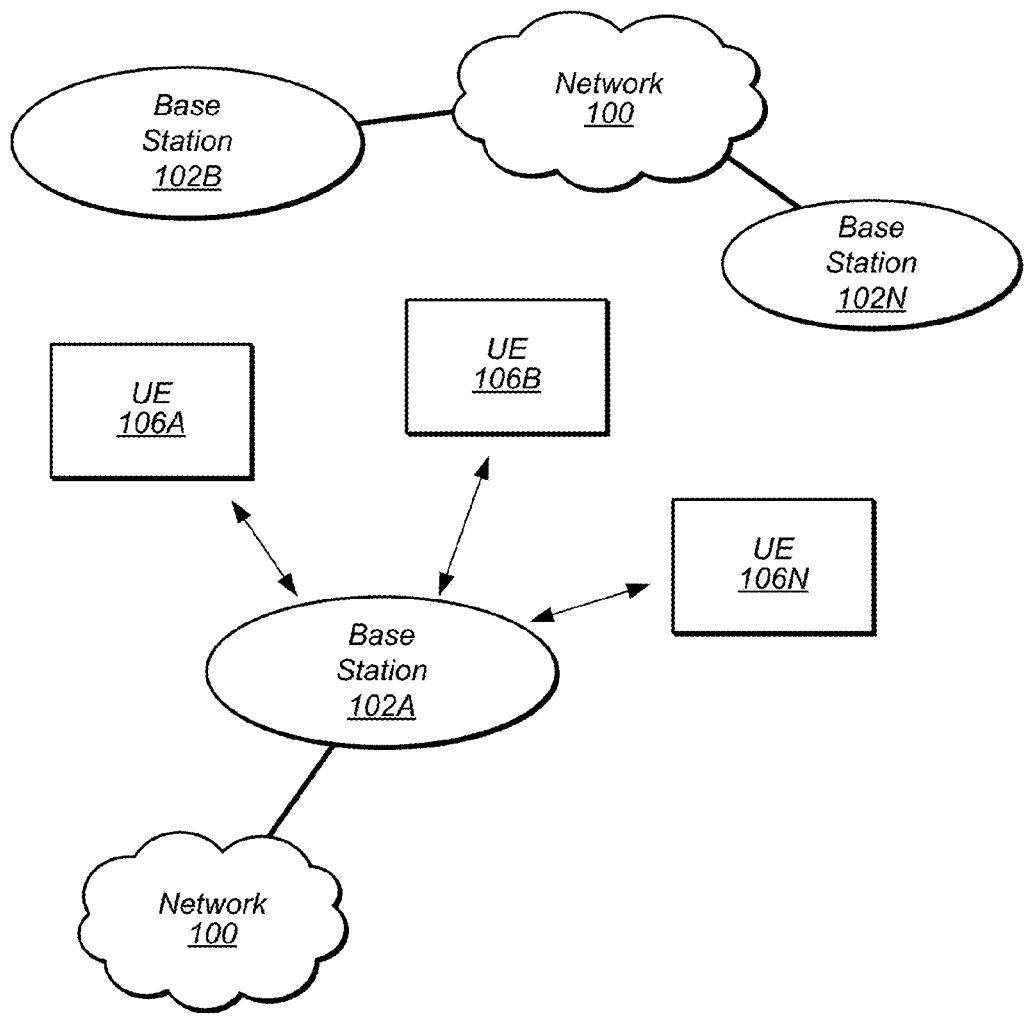
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
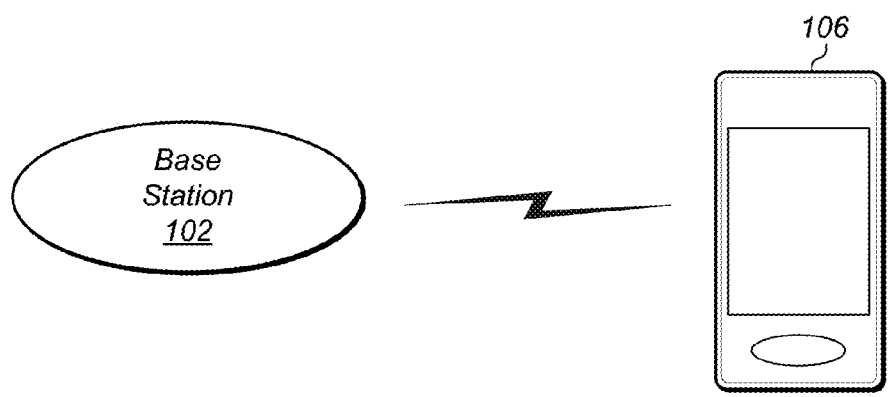
FIG. 2 illustrates a base station ("BS", or "eNodeB" or "eNB" in an LTE context) in communication with a user equipment ("UE") device.
Figure 3:
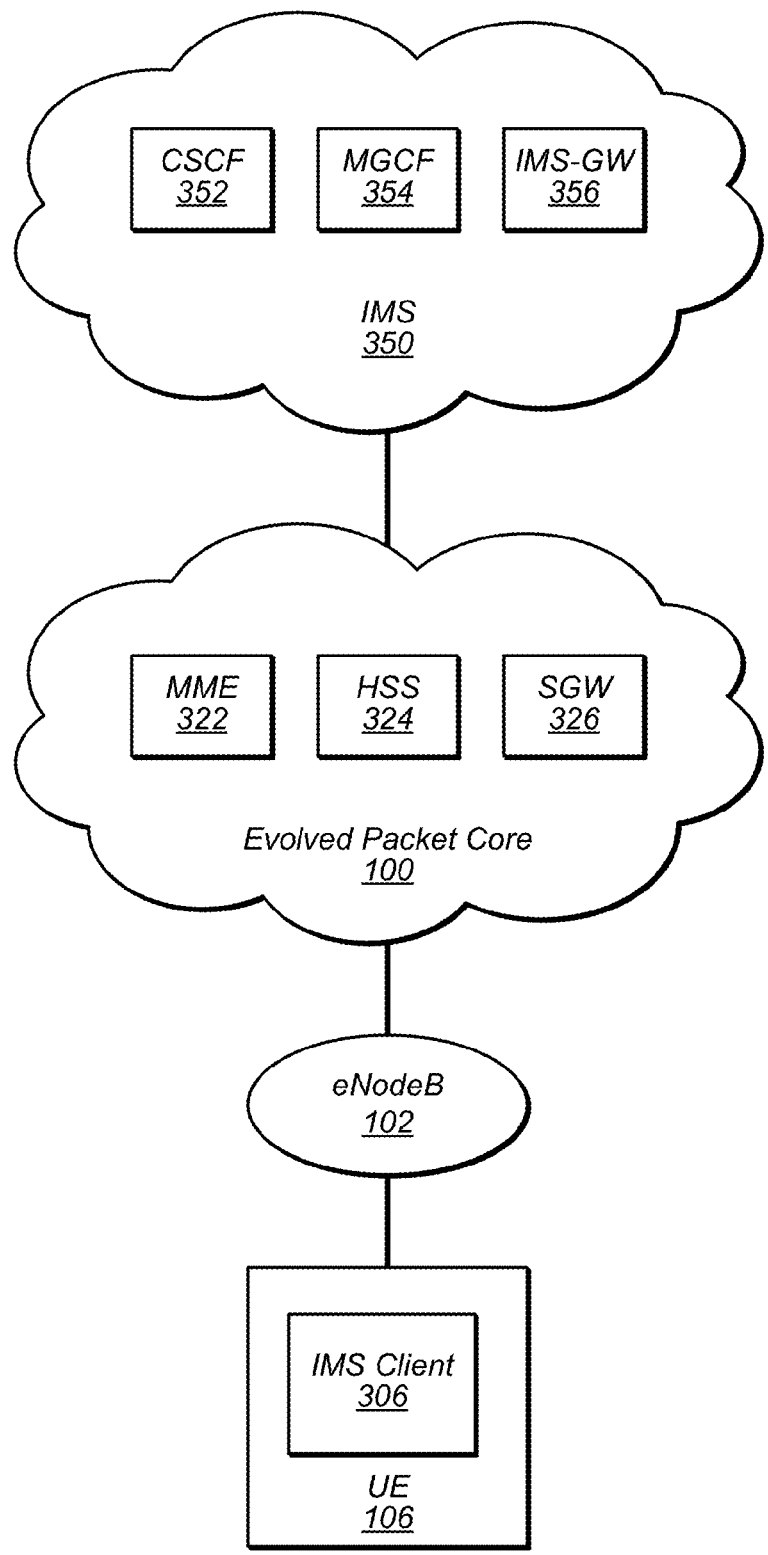
FIG. 3 illustrates an exemplary wireless communication system which may be used for voice over IP embodiments.

FIGS. 1-3—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may provide a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N). The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of GSM, UMTS, CDMA2000, LTE, LTE-A, WLAN/ Wi-Fi, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless communication system that may be particularly useful for implementing voice over IP communication, such as voice over LTE (VoLTE) in an LTE network. Note that, as used herein, the term "VoLTE" may include voice services over present and/or future versions of LTE, for example including LTE-A.

As shown, the UE 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. The IMS 350 may include various other devices known to those skilled in the art as well.

Thus, the system of FIG. 3 illustrates an exemplary portion of a data pathway which may be used for voice over IP communication, e.g., VoLTE.

Figure 4:
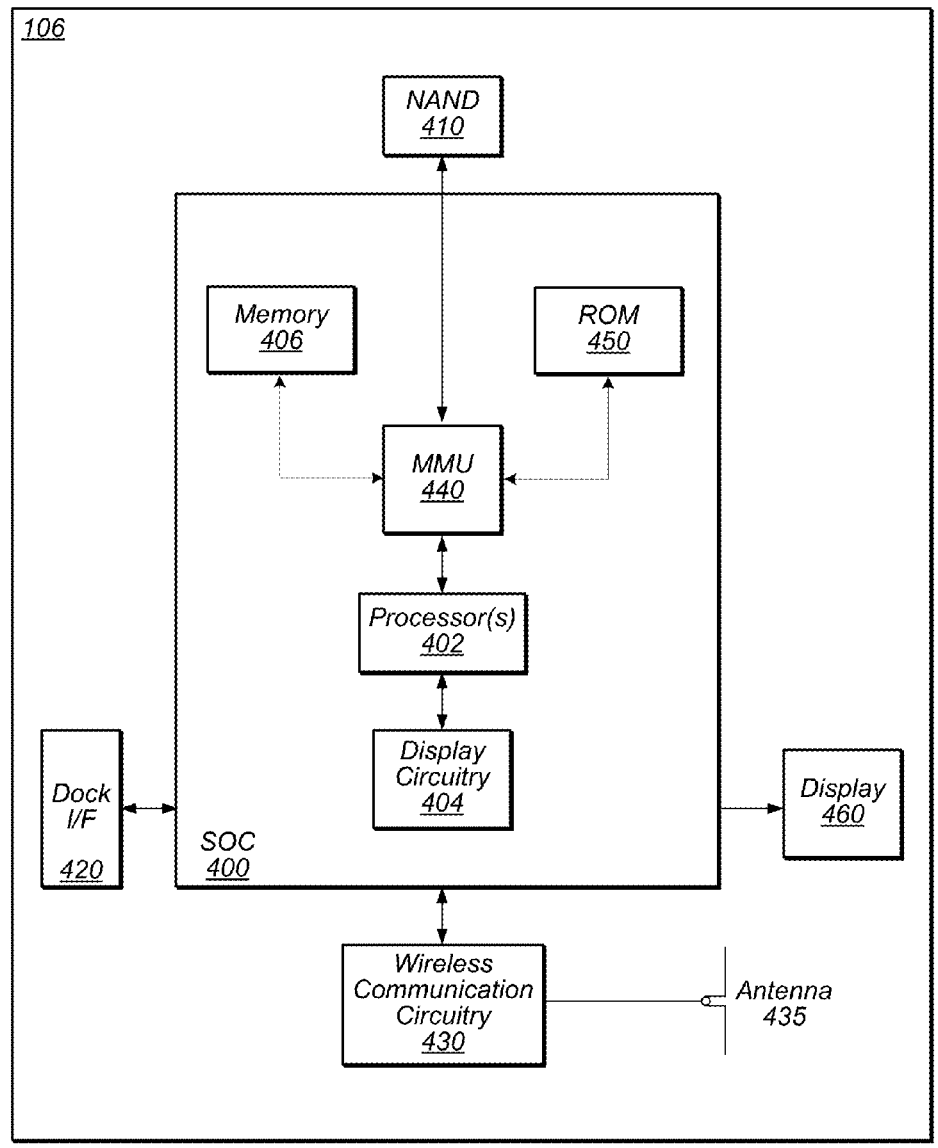
FIG. 4 illustrates an exemplary block diagram of a UE.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (e.g., including one or more radios), connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna 435 to perform the wireless communication.

The UE 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 106 may include hardware and software components for implementing features for communicating using one or more wireless communication technologies, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
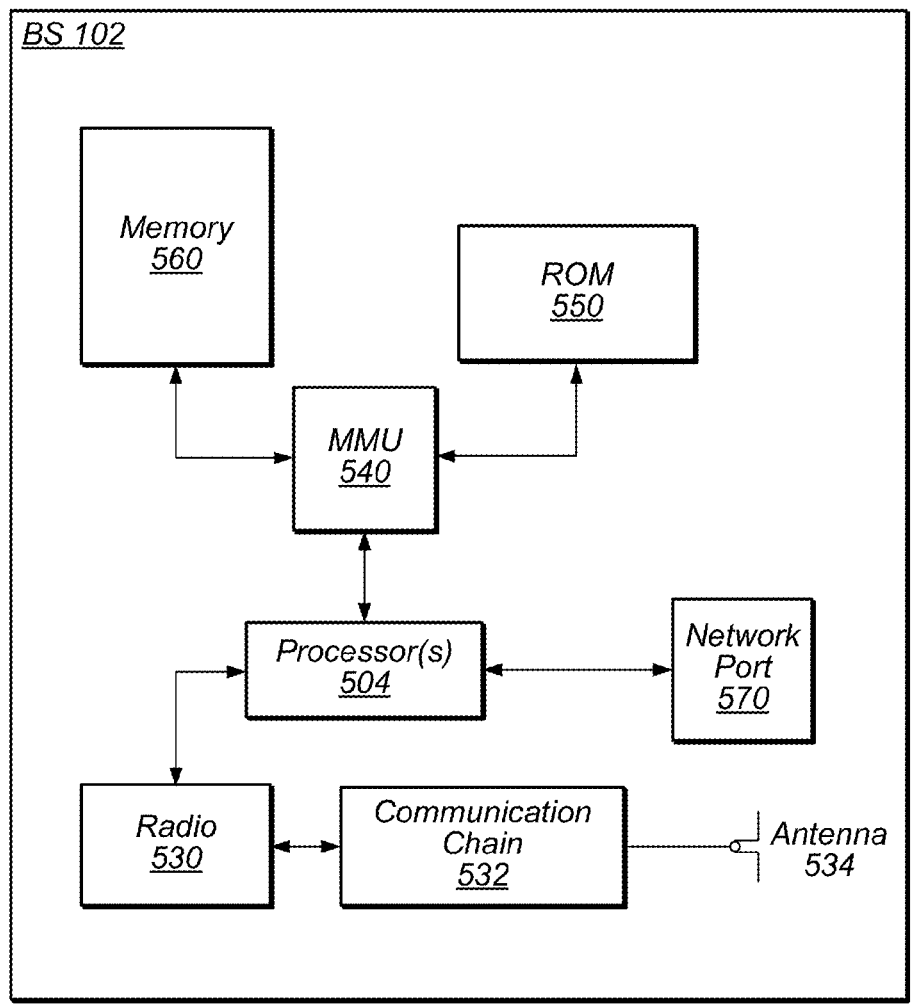
FIG. 5 illustrates an exemplary block diagram of a BS.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various wireless communication technologies, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
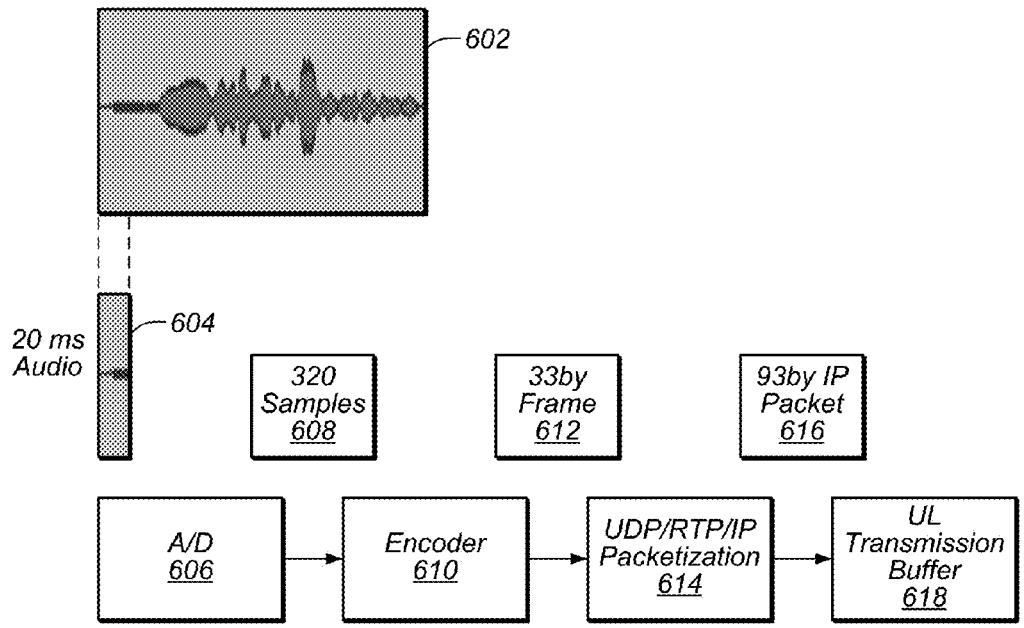
FIG. 6 illustrates an exemplary audio processing process for packet-switched voice calling services.

FIG. 6—Audio Processing for Packet-Switched Voice Calling Services

Many cellular communication technologies (e.g., GSM, UMTS, CDMA2000) provide voice services using circuit-switched communication. Packet-switched communication capabilities may also be provided according to such technologies, by way of which it may be possible to provide "over-the-top" (OTT) voice over IP (or "VoIP") voice services. Additionally, some cellular technologies, such as LTE, may provide well-integrated packet switched voice communication techniques (e.g., VoLTE). While OTT VoIP services may also be used with LTE, the close integration of VoLTE with LTE protocol mechanisms such as connected-mode discontinuous reception (C-DRX), semi-persistent scheduling (SPS), transmission time interval (TT) bundling, and others, may result in better user experience with VoLTE.

In VoLTE, users speech may be encoded using an adaptive multi-rate (AMR) or AMR-wideband (AMR-WB) codec, then encapsulated in real-time transport protocol (RTP)

packets. User Datagram Protocol (UDP) and Internet Protocol (IP) may then be used to route the RTP packets. The AMR and AMR-WB codecs may generate a speech frame each 20 ms.

FIG. 6 illustrates an exemplary process for a UE to generate audio speech frames for VoLTE communication using an AMR-WB codec. Note that while FIG. 6 is provided as being illustrative of one possible exemplary process for generating audio speech frames, it is not intended to be limiting to the disclosure as a whole. Numerous alternatives to and variations of the following details are also possible and should be considered within the scope of the present disclosure.

As shown, from audio signals 602 received by the UE, a 20 ms portion of audio data 604 may be collected and provided to an analog to digital converter (ADC) 606. The resulting samples 608 may be provided to the AMR-WB encoder 610, which may produce a speech frame 612 from the samples 608. The frame may be provided for RTP/UDP/IP packetization 614, which may produce an IP packet 616. The IP packet 616 may be provided to an uplink transmission buffer 618, from which they may proceed through the UE's baseband protocol stack for transmission. As part of this process, packet data convergence protocol (PDCP), radio link control (RLC) and media access control (MAC) headers may also be added to the speech frames.

Figure 7:
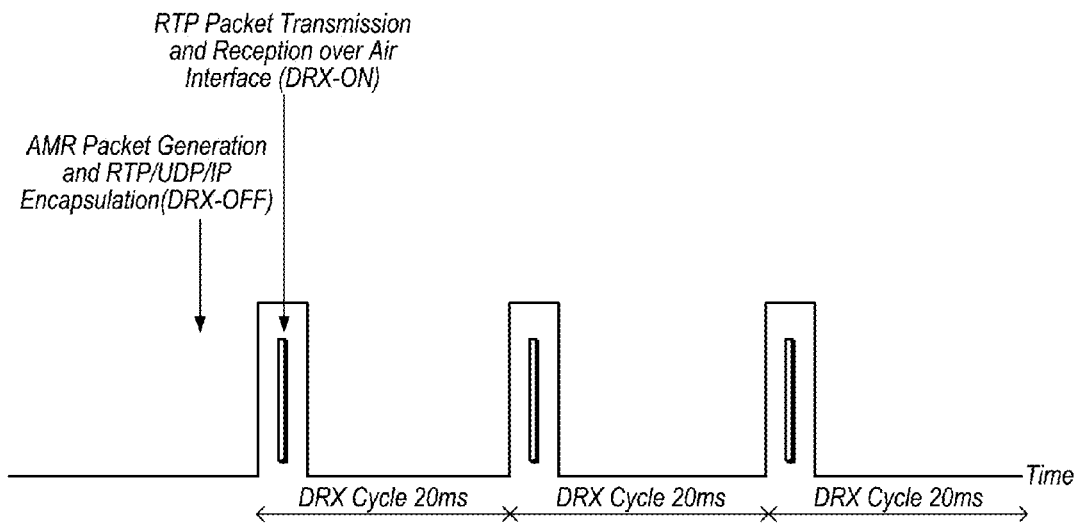
FIGS. 7-8 illustrate exemplary aspects of VoLTE C-DRX operation.
Figure 8:
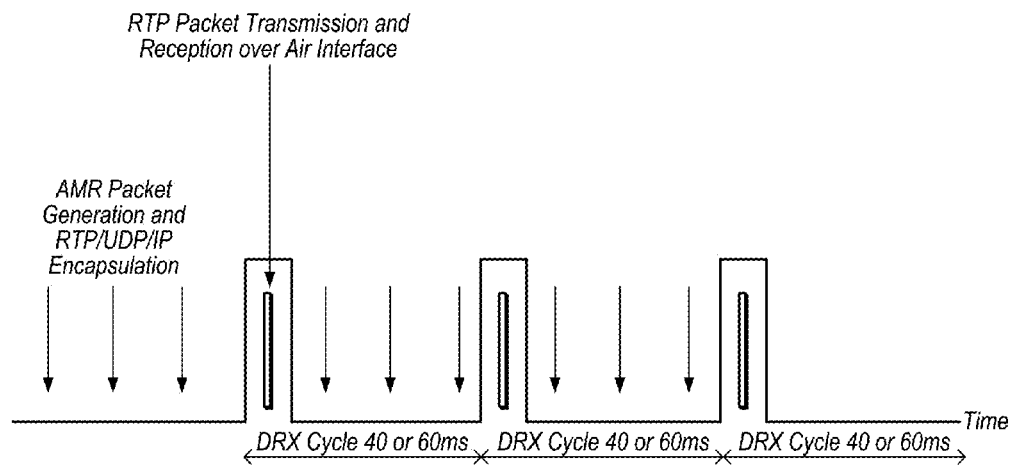

FIGS. 7-8—Connected-Mode DRX and VoLTE Packets

As previously noted, VoLTE may be integrated with LTE protocol mechanisms such as C-DRX. DRX may be used to reduce UE power consumption during VoLTE communication. FIGS. 7-8 illustrate exemplary aspects of such integration. Note that while FIGS. 7-8 are provided as being illustrative of exemplary possible aspects of C-DRX operation in conjunction with communication of audio data, they are not intended to be limiting to the disclosure as a whole. Numerous alternatives to and variations of the following details are also possible and should be considered within the scope of the present disclosure.

As shown in both of FIGS. 7-8, AMR speech frames may be generated and undergo RTP/UDP/IP encapsulation during the DRX-OFF (or "off-duration") portion of each C-DRX cycle. During the DRX-ON (or "on-duration") portion of each C-DRX cycle, transmission and reception of audio packets over the LTE air interface may be performed.

FIG. 7 illustrates an exemplary C-DRX configuration in which 20 ms DRX cycles are used. In such a case, one audio frame may be transmitted each DRX cycle; in other words, each audio packet may include one AMR speech data frame and various headers.

FIG. 8 illustrates an exemplary C-DRX configuration in which 40 ms or 60 ms DRX cycles are used. In such cases, since AMR speech frames may each represent 20 ms of audio data, two (for 40 ms cycles) or three (for 60 ms cycles) audio frames may be transmitted each DRX cycle; in other words, each audio packet may include multiple AMR speech data frames along with various headers. In such a case, as one possibility, AMR/RTP/UDP/IP/PDCP packets may be buffered in the RLC layer during the DRX-OFF period. In this case, during the DRX-ON period, the multiple AMR/RTP/UDP/IP/PDCP packets may be encapsulated in single RLC/MAC headers and sent over the air. Alternatively (as further described herein with respect to FIG. 10), if desired, the RTP layer may be informed of the current C-DRX cycle length, and may buffer multiple AMR speech frames in an RTP buffer as appropriate for 40 ms or 60 ms C-DRX cycle lengths before passing on the multiple AMR speech frames for UDP/IP/PDCP/RLC/MAC encapsulation as a single RTP packet.

Figure 9:
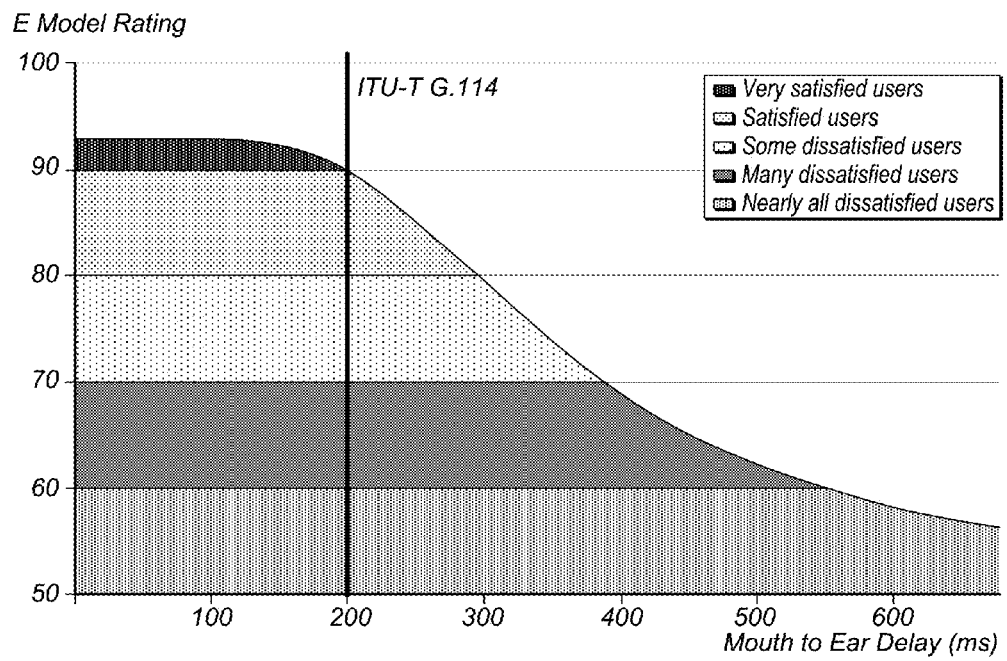
FIG. 9 illustrates an exemplary E-Model representing mouth-to-ear delay versus audio quality.

FIG. 9—Mouth-to-Ear Delay versus Audio Quality

Using longer DRX cycles for C-DRX may result in greater power savings for a UE. However, longer DRX cycles may also result in greater communication latency. In the context of voice communication, this may mean that the "mouth-to-ear" delay (i.e., the delay between a user at one UE speaking and a user at another UE engaged in a voice call with the first UE hearing that speech) may be greater as DRX cycle length increases. Up to a certain point, such delays may be unnoticeable to users, or at least not sufficiently noticeable as to result in dissatisfaction and negative user experience. However, particularly beyond a certain point increasing mouth-to-ear delay may be increasingly noticeable to users and/or may result in increasing user dissatisfaction and negative user experience.

The estimated effects of varying mouth-to-ear delay values (in ms) on user satisfaction with respect to conversational speech according to the international telecommunication union (ITU) E-model are illustrated in FIG. 9. As shown, for delays of up to 200 ms, users may generally be very satisfied, with highest satisfaction achieved when mouth-to-ear delays are below approximately 150 ms. User satisfaction may fall off moderately as delays increase, such that some users may be dissatisfied as delays rise into the 300-400 ms range, and nearly all users may be dissatisfied if mouth-to-ear delay is allowed to rise above approximately 500 ms.

It should be noted that while the model illustrated in FIG. 9 may be used as one possible guide for determining an optimal mouth-to-ear delay for voice communications, it is not intended to be limiting to the disclosure as a whole. Any number of additional or alternative considerations may be used to determine acceptable or desirable mouth-to-ear delay for voice communications within the scope of the present disclosure, as desired.

Figure 10:
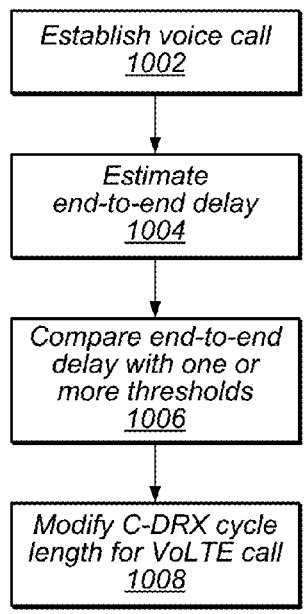
FIG. 10 is a flowchart diagram illustrating an exemplary method for performing end-to-end delay adaptation for a packet-switched voice call.

FIG. 10—End-to-End Delay Adaptation Flowchart

As previously noted, although increasing DRX cycle length may reduce power consumption of a UE engaged in cellular communication, it may also be preferable to avoid excessive mouth-to-ear delays for voice calls to maintain high user satisfaction and provide an overall good user experience. FIG. 10 is a flowchart diagram illustrating a method for end-to-end delay adaptation in a cellular voice call, according to which a UE's DRX cycle length may be modified during a voice call to balance power consumption considerations with voice call quality considerations.

The method of FIG. 10 may be used in conjunction with any of the computer systems or devices shown in the above Figures, among other devices. The method may be implemented by a "first UE". Note that while the scheme shown in FIG. 10 may be used in conjunction with LTE systems (such as described with respect to FIG. 10) as one possibility, it may also be possible to use such a scheme (or a variation thereon) in conjunction with any of various other cellular systems, as desired.

Note that in various embodiments, some of the elements of the method shown may be performed concurrently, in a different order than shown, or may be omitted. Additional elements may also be performed as desired. As shown, the method may operate as follows.

In 1002 a voice call may be established. The call may be established between the first UE and a second UE via a cellular (e.g., LTE) network. The voice call may utilize packet-switched communication. As one possibility, the voice call may be a VoLTE call. Establishing the voice call may include any of various call setup procedures. As one possibility establishing the voice call may include utilizing an IP multimedia subsystem (IMS) and session-initiation protocol (SIP) signaling to establish a real-time transport protocol (RTP) stream between the first UE and the second UE. The RTP stream may itself be carried over LTE (e.g., in the case of VoLTE) or another cellular communication protocol radio bearers, which may be established using RRC signaling between each of the first UE and the second UE and one or more intermediary (e.g., radio) networks. Variations on or alternative to such techniques for establishing the voice call may also or alternatively be used, as desired. The first UE may receive an indication of an initial DRX (e.g., C-DRX) cycle length for the voice call from the cellular network. Once the voice call is established, the first UE may perform voice (e.g., VoLTE) communication with the second UE via the cellular network according to a DRX mode with the initial DRX cycle length.

In 1004, mouth-to-ear delay of the voice call may be estimated. As previously noted, mouth-to-ear delay may include the amount of time between audio (e.g., speech) data being collected at one endpoint (possibly after encoding and encapsulation) and presented (e.g., decoded and played) at the other endpoint. A variety of factors may be responsible for mouth-to-ear delay, including audio encoding/decoding delays, UE internal delays, and RTP latency. RTP latency (or RTP end-to-end delay) itself may include over the air latency and core network latency, which may be affected by such factors as network data routing, UE mobility functions, roaming considerations, retransmissions, DRX delays, etc. Such factors may not be fixed: their impact may change between different calls and even during the same voice call, potentially resulting in different end-to-end delay values at different times and/or for different calls. Note that at least in some instances, each endpoint of a VoLTE call may experience a DRX delay, which may affect end-to-end delay between the endpoints in a cumulative manner. However, a given endpoint (e.g., the first UE) may only be aware of (and have some control over) its own DRX cycle length.

While RTP delays (i.e., including OTA latency and core network latency) may be variable, audio encoding/decoding delays and UE internal delays may in many instances be at least relatively fixed. Accordingly, at least in some instances, RTP end-to-end delay may be estimated and used as a proxy or substitute for mouth-to-ear delay.

The end-to-end delay may be estimated in any of various possible ways. As one possibility, real-time transport protocol control protocol (RTCP) sender reports and received reports may be used to estimate the RTP end-to-end delay. For example, the first UE may send an RTCP sender report to the second UE via the cellular communication link between the first and second UEs, and may receive an RTCP received report from the second UE in response to the RTCP sender report. The RTP end-to-end delay may thus be estimated based on the RTCP sender and received reports, e.g., using timestamps included in each in conjunction with the first UE's sending source clock. For example, a timestamp value corresponding to a time at which the first UE sends the RTCP sender report to the second UE and a delay value corresponding to a delay between the second UE receiving the RTCP sender report and the second UE transmitting the RTCP received report may be subtracted from a timestamp value corresponding to a time at which the first UE receives the RTCP received report from the second UE to produce a round trip time value, and this round trip time value may be divided by two to produce the estimated RTP end-to-end delay between the first UE and the second UE. Other techniques are also possible.

In 1006, the estimated end-to-end delay may be compared with one or more thresholds. The comparison(s) to the threshold(s) may be used to determine whether or not to modify the DRX cycle used by the first UE. For example, a first delay threshold may be used to determine if DRX cycle length should be decreased, while a second delay threshold may be used to determine if DRX cycle length should be increased.

In 1008, if it is determined to modify the DRX cycle length used by the first UE for the voice call based on the comparison(s) with the delay threshold(s), the C-DRX cycle length for the voice call may be modified. For example, if the estimated end-to-end delay is greater than the first delay threshold, the DRX cycle length may be decreased. This may help prevent the mouth-to-ear delay for each party of the call from exceeding a desired maximum, which may help ensure positive user experience. As another example, if the estimated end-to-end delay is less than the second delay threshold, the DRX cycle length may be increased. This may help reduce power consumption by the first UE, as the first UE may be able to wake up for transmitting and receiving communications less frequently when using a longer DRX cycle and correspondingly spend more time in a low-power state, which may also help ensure positive user experience (e.g., by increasing battery life).

Note that the first delay threshold may be greater than the second delay threshold, e.g., such that there may be a range of end-to-end delay values which are neither greater than the first delay threshold nor less than the second delay threshold. If the estimated end-to-end delay falls in this range, it may be determined not to modify the DRX cycle length used by the first UE for the voice call. This range may be a preferred end-to-end delay range whose values may be selected to provide a desired balance between reducing power consumption and avoiding excessive mouth-to-ear delay.

In some instances, the first UE may also or alternatively consider one or more other factors in addition to end-to-end delay when determining whether or not to modify its DRX cycle length. For example, block error rate (BLER) may be monitored (e.g., based on cyclic redundancy checks (CRCs) on the downlink and based on positive and negative acknowledgements (ACKs/NACKs) on the uplink), and may influence the determination decision in favor of decreasing DRX cycle length as BLER increases, and/or a BLER over a certain threshold may be used as an alternate trigger to decrease DRX cycle length. As another example (in addition or as an alternative), packet hybrid automatic repeat request (HARQ) retransmission rates may be monitored, and may influence the determination decision in favor of decreasing DRX cycle length as HARQ retransmission rates increase, for example if it is inferred that end-to-end delay is greater than the first delay threshold based on current HARQ retransmission rate and a previous end-to-end delay estimation. Thus, at least in some instances, any or all of various voice call quality indicators (such as end-to-end delay, HARQ retransmission rate, and/or BLER, among others) may be monitored during a voice call and used as a basis (e.g., in conjunction with one or more call quality thresholds) to modify (or determine to not modify) DRX cycle length, as desired.

Modifying the DRX cycle length may be achieved by providing an indication to the cellular network to modify the DRX cycle length for the voice call. The indication may specify the desired DRX cycle explicitly, or may simply provide an indication to incrementally increase or decrease the DRX cycle according to an agreed upon increment. For example, in some instances, only a specified set of DRX cycle lengths may be used. This may be desirable, for instance, if the voice call includes communication of audio packets which each include audio data corresponding to a fixed length of time (e.g., 20 ms). In such a case, it may be efficient for the specified configurable C-DRX cycle lengths which may be used for a voice call to be integer multiples of such a fixed length of time (e.g., 20 ms, 40 ms, 60 ms).

In such a case, if the initial DRX cycle length were 60 ms, and the first UE provided an indication to the cellular network to decrease the UE's DRX cycle, the network might be able to infer that the modified DRX cycle length would be 40 ms and configure itself and the first UE accordingly. As one possibility, the 3GPP rel. 11 mechanism "power profile" (such as described in 3GPP TS 36.331) may be used to indicate a desired DRX cycle length modification to the network by a UE. For example, setting the power profile bit to a value of '0' might indicate to reduce the DRX cycle length, while a value of '1' might indicate to increase the DRX cycle length, or vice versa. Other mechanisms are also possible.

Once the DRX cycle is modified, the first UE may perform communicate with the second UE via the cellular network in the DRX mode according to the modified DRX cycle length. Alternatively, if it is determined to shorten the DRX cycle when the first UE is already using the shortest configured C-DRX cycle, the "DRX cycle modification" may include performing cellular communication in connected mode without DRX (i.e., with no DRX cycle).

If desired, the first UE may monitor (measure/estimate) end-to-end delay of the voice call periodically and/or in an event-triggered manner (e.g., multiple times) over the course of the voice call, and further modify the DRX cycle, e.g., depending on changing call conditions. For example, after at one time determining that end-to-end delay is above the first threshold and accordingly shortening the DRX cycle length, conditions may improve such that at a later time the end-to-end delay of the voice call falls below the second threshold. In such a case, the DRX cycle length might be lengthened (e.g., back to the initial DRX cycle length, or to a different DRX cycle length) at the later time. As another example, after at one time determining that end-to-end delay is above the first threshold and accordingly shortening the DRX cycle length, it may at a later time be determined that end-to-end delay is still (or again) above the first threshold. In such a case, the DRX cycle length might be further shortened at the later time. Any number and manner of such DRX cycle length modifications may be performed during a voice call, as desired.

Thus, the first UE may adaptively modify its DRX cycle length during a voice call based on the end-to-end delay of the voice call, which may in turn affect the subsequent end-to-end delay of the voice call, in order to keep the end-to-end delay within a desired range. This 'end-to-end delay adaptation' process may provide a mechanism for the first UE to optimize its DRX cycle for power consumption without degrading call audio quality.

Figure 11:
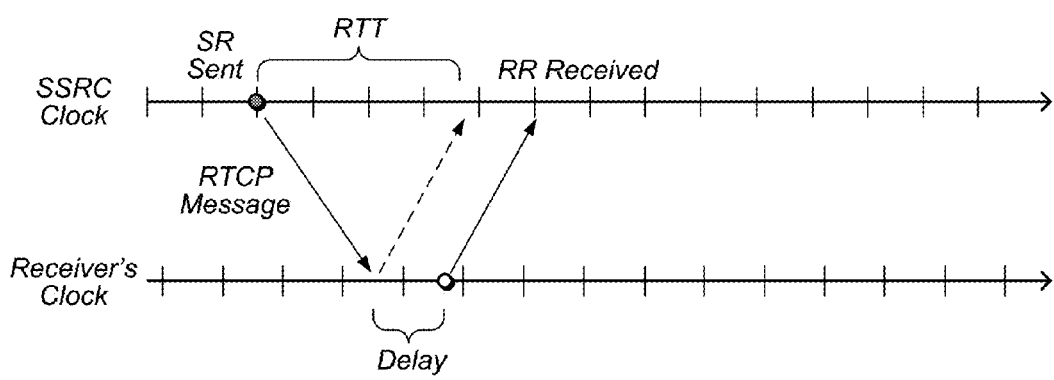
FIG. 11 is a diagram illustrating an exemplary technique for estimating RTP end-to-end delay.

FIG. 11—Using RTCP to Estimate AMR Round Trip Delay

As previously noted, as one possibility RTP end-to-end time may be used as a proxy or surrogate for mouth-to-ear delay in conjunction with the method of FIG. 10. FIG. 11 illustrates one such possible technique for using RTP control protocol (RTCP) to measure the RTP round trip time between the first UE and the second UE, from which the estimated one way RTP delay may be calculated. Note that FIG. 11 and the information provided with respect thereto are provided as being illustrative of certain possible exemplary aspects of RTP end-to-end delay estimation such as might be implemented according to the method of FIG. 10, and are not intended to be limiting to the disclosure as a whole. Numerous alternatives to and variations of the following details are also possible and should be considered within the scope of the present disclosure.

As shown, the first UE may send a RTCP sender report (SR) to the second UE at a known time ("SR sent time") according to a clock of the first UE (the sending source clock or SSRC clock). This information may be included in the SR. The second UE may receive the SR from the first UE, and after a delay, send a RTCP received report (RR) to the first UE in response to the SR. The first UE may also receive the RR at a known time ("RR received time") according to the clock of the first UE. Additionally, the RR may include a "delay since last SR" (DLSR) field to indicate the length of the delay at the second UE between receiving the SR and sending the RR, and a "last SR timestamp" (LSR) field to indicate the SR sent time for the SR corresponding to the RR.

Thus, by subtracting the SR sent time and the DLSR from the RR received time, the first UE may calculate the RTP round trip time (RTT). The RTP one way delay may be estimated to be half of the RTP RTT (e.g., may be obtained by dividing the RTP RTT by two).

Figure 12:
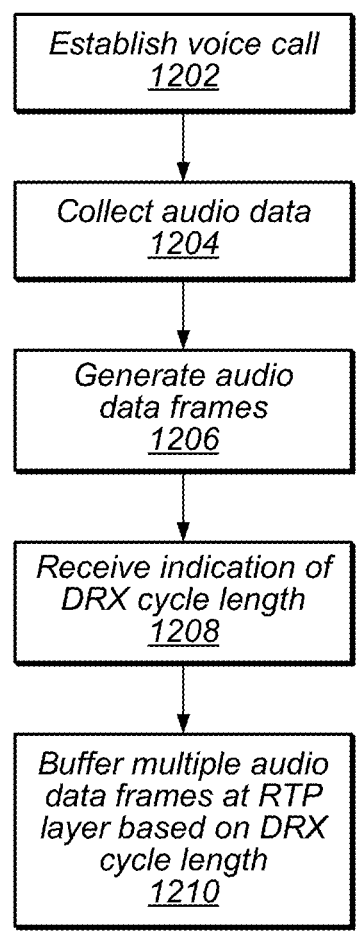
FIG. 12 is a flowchart diagram illustrating an exemplary method for buffering and aggregating audio frames at an RTP layer.

FIG. 12—RTP Layer Audio Frame Aggregation Flowchart

As previously noted, when DRX cycle lengths are used which are longer than the length of time represented by each audio speech frame in a packet-switched voice call, there may be multiple options for buffering and aggregating audio speech frames between DRX-ON periods. FIG. 12 is a flowchart diagram illustrating a method for a UE to buffer and aggregate audio frames of a cellular voice call at an RTP layer of the UE. Such a technique may reduce audio packet overhead relative to buffering and aggregating audio frames at an RLC layer of the UE.

The method of FIG. 12 may be used in conjunction with any of the computer systems or devices shown in the above Figures, among other devices. The method may be implemented by a "first UE". Note that while the scheme shown in FIG. 12 may be used in conjunction with LTE systems (such as described with respect to FIG. 12) as one possibility, it may also be possible to use such a scheme (or a variation thereon) in conjunction with any of various other cellular systems, as desired.

Note that in various embodiments, some of the elements of the method shown may be performed concurrently, in a different order than shown, or may be omitted. Additional elements may also be performed as desired. As shown, the method may operate as follows.

In 1202 a voice call may be established. The call may be established between the first UE and a second UE via a cellular (e.g., LTE) network. The voice call may utilize packet-switched communication. As one possibility, the voice call may be a VoLTE call. Establishing the voice call may include any of various call setup procedures. As one possibility, establishing the voice call may include utilizing an IP multimedia subsystem (IMS) and session-initiation protocol (SIP) signaling to establish a real-time transport protocol (RTP) stream between the first UE and the second UE. The RTP stream may itself be carried over LTE (e.g., in the case of VoLTE) or another cellular communication protocol radio bearers, which may be established using RRC signaling between each of the first UE and the second UE and one or more intermediary (e.g., radio) networks. Variations on or alternative to such techniques for establishing the voice call may also or alternatively be used, as desired. In some instances, establishing the voice call may include configuring discontinuous reception at either or both of the first UE or the second UE.

In 1204, audio data may be collected. The audio data may be collected at one or more microphones of the first UE. The audio data collected may correspond to speech by a user of the first UE, and/or any of various other types of audio.

In 1206, audio data frames (audio speech frames) may be generated. Generating the audio data frames may include compressing the collected audio data using a codec (such as AMR or AMR-WB, among various possibilities). Each audio data frame generated by the codec may include audio data corresponding to a specific ("first") length of time. For example, as previously noted, audio data frames generated using AMR and AMR-WB may correspond to 20 ms of audio data. Other values are also possible.

In 1208, an indication of a DRX cycle length may be received. The indication may be received by the first UE from the cellular network, for example by an RRC layer of the first UE as part of RRC setup for the voice call. As another possibility, the indication may be received during the voice call, for example after the DRX cycle has been modified as part of the end-to-end delay adaptation techniques described herein with respect to FIG. 10.

The DRX cycle length may be equal to or longer than the first length of time, and may (at least in some instances) be an integer multiple of the first length of time. For example, for 20 ms audio data frames generated using AMR, the DRX cycle length might be 20 ms, 40 ms or 60 ms. Other values are also possible.

An indication of the DRX cycle length may be provided to an RTP layer of the UE. As one possibility, the indication may be provided from the RRC layer of the first UE to the RTP layer by way of a MAC layer of the first UE, as one possibility. Alternatively, if desired, rather than an explicit indication of the DRX cycle length, the MAC layer may provide to the RTP layer an indication of a number of audio data frames to buffer and aggregate at the RTP layer based on the DRX cycle length. In order to facilitate such indication capability, a signaling link may be established between the MAC layer and the RTP layer.

If no DRX is configured, or if DRX is configured with a DRX cycle length equal to the first length of time, the RTP layer may encapsulate each audio data frame as an RTP packet with its own RTP header before sending the resulting RTP packet to the next layer (e.g., UDP).

If DRX is configured with a DRX cycle length longer than the first length of time (e.g., twice or three times the first length of time), in 1210, multiple audio data frames may be buffered and aggregated at the RTP layer based on the DRX cycle length. For example, if the DRX cycle length is twice the first length of time, the RTP layer may buffer and aggregate two audio data frames before sending the resulting RTP packet to the next layer. Similarly, if the DRX cycle length is thrice the first length of time, the RTP layer may buffer and aggregate three audio data frames before sending the resulting RTP packet to the next layer.

Each RTP packet may be sent through a (e.g., cellular) protocol stack of the first UE, for example by way of UDP, IP, PDCP, RLC, and MAC layers, before being transmitted over the physical layer (i.e., over the air). By aggregating audio data frames early (higher) in the voice calling protocol stack, such as at the RTP layer, the overhead associated with each audio packet may be substantially reduced relative to aggregating audio data frames later (lower) in the stack, such as at the RLC layer. For example, if three audio data frames are transmitted each DRX cycle (e.g., as might be the case with a 60 ms C-DRX cycle and AMR-WB encoding), aggregating at the RTP layer would result in a single header for each of RTP, UDP, IP, PDCP, RLC, and MAC, whereas aggregating at the RLC layer would result in three headers for each of RTP, UDP, IP, and PDCP in addition to a single header for each of RLC and MAC.

Such a reduction in overhead may result in a shorter overall packet length, which may allow for the first UE to utilize fewer network resources for transmission, to successfully transmit with a lower SINR, and/or to conserve power, among various possible benefits.

FIGS. 13-17—Protocol Stack Diagram and Possible Audio Packet Formats

Figure 13:
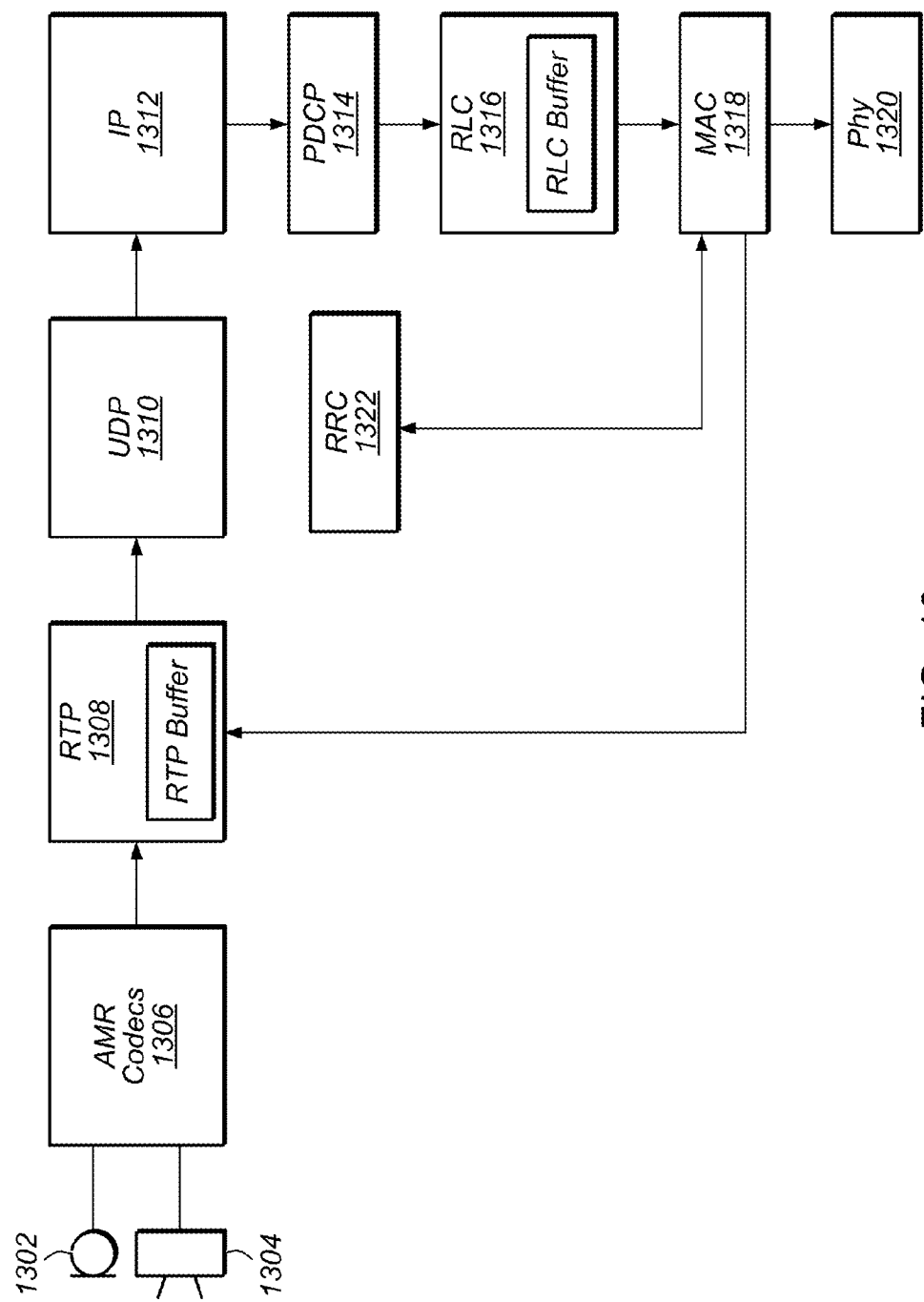
FIG. 13 illustrates an exemplary packet-switched voice calling protocol stack diagram.

FIG. 13 illustrates an exemplary protocol stack of a UE which may be used in conjunction with packet-switched cellular voice calling services, as one possibility. FIGS. 14-17 illustrate the different packet formats which might result from RLC aggregation versus RTP aggregation for each of scenarios in which 40 ms DRX cycle lengths and 60 ms DRX cycle lengths are used. Note that FIGS. 13-17 and the information provided with respect thereto are provided as being illustrative of certain possible exemplary aspects of RTP layer audio frame aggregation such as might be implemented according to the method of FIG. 12, and are not intended to be limiting to the disclosure as a whole. Numerous alternatives to and variations of the following details are also possible and should be considered within the scope of the present disclosure.

As shown in FIG. 13, the UE may include a microphone 1302 and a receiver 1304 coupled to AMR codecs 1306. The AMR codecs may provide encoding/decoding of audio data. Encoded AMR audio frames may be provided to an RTP layer 1308. The RTP layer 1308 may include an RTP buffer, which may be used to buffer AMR audio frames if buffering and aggregating of audio frames at the RTP layer 1308 (such as according to the method of FIG. 12) is enabled based on the DRX configuration of the UE. This may be enabled by way of signaling links between an RRC layer 1322 and a MAC layer 1318 of the UE, and between the MAC layer 1318 and the RTP layer 1308 of the UE, by way of which an indication may be provided to the RTP layer of whether or not to buffer and aggregate audio frames at the RTP layer and/or how many audio frames to buffer and aggregate at the RTP layer.

As shown, after RTP encapsulation of one or more AMR audio frames, RTP packets may be provided to each in turn of a UDP layer 1310, an IP layer 1312, and a PDCP layer 1314, each of which may further encapsulate the data it receives with a respective header. These AMR/RTP/UDP/IP/PDCP packets may be provided to an RLC layer 1316, where they may be buffered prior to transmission. When ready to transmit, the RLC layer 1316 may encapsulate buffered packets with an RLC header and provide them to the MAC layer 1318, which may in turn encapsulate the RLC packet with a MAC header, and finally provide the MAC packet to a PHY layer 1320 for over-the-air transmission.

Note that if no RTP buffer were used, each AMR audio frame would be separately encapsulated by RTP/UDP/IP/PDCP, and would not be aggregated until reaching the RLC buffer.

FIG. 14 illustrates a packet format which would result under a 40 ms DRX cycle length scenario if no RTP buffering and aggregation is used. As shown, the packet may include a MAC header, a RLC header, and two each of PDCP/IP/UDP/RTP headers: one for each AMR audio frame. In contrast, FIG. 15 illustrates a packet format which would result under a 40 ms DRX cycle length scenario if RTP buffering and aggregation is used. As shown, the packet may include a single header for each of MAC, RLC, PDCP, IP, UDP, and RTP, along with the two AMR audio frames.

FIG. 16 illustrates a packet format which would result under a 60 ms DRX cycle length scenario if no RTP buffering and aggregation is used. As shown, the packet may include a MAC header, a RLC header, and three each of PDCP/IP/UDP/RTP headers: one for each AMR audio frame. In contrast, FIG. 17 illustrates a packet format which would result under a 60 ms DRX cycle length scenario if RTP buffering and aggregation is used. As shown, the packet may include a single header for each of MAC, RLC, PDCP, IP, UDP, and RTP, along with the three AMR audio frames.

Thus, aggregating audio frames at the RTP layer may substantially reduce the number of headers and the total overhead included when transmitting audio data during a packet-switched voice call in which a DRX cycle length which is longer than the length of audio frames of the voice call. It will be recognized that the length of each of the possible headers (and thus the exact overhead savings) may vary according to different scenarios. As one exemplary possibility, however, consider the following scenario. For AMR-WB 12.65, each audio frame may include 253 bits. Using IPv4, UDP, and RTP, approximately 40 bytes of headers may be added. PDCP may include up to a further 2 bytes, while RLC may include up to a still further 2 bytes, and MAC may include 8 bits. Thus, by eliminating the use of multiple IPv4, UDP, RTP, and PDCP headers in this exemplary scenario, audio packet size may be reduced by approximately 30%, to approximately 109 bytes from 154 bytes for a 40 ms DRX scenario, or by approximately 39%, to approximately 141 bytes from 231 bytes for a 60 ms DRX scenario. Note that if robust header compression (ROHC) is used, the header overhead may be substantially reduced (e.g., from 40 bytes for IPv4/UDP/RTP headers to 3-5 bytes), which may in turn affect the amount of overhead reduction obtained by aggregating AMR audio frames at the RTP layer.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a first wireless user equipment (UE) to perform wireless communication, comprising:
    establishing a voice-over long-term evolution (VoLTE) call with a second UE via a cellular network, wherein establishing the VoLTE call comprises receiving an indication of an initial discontinuous reception (DRX) cycle length for the VoLTE call from the cellular network;
    performing VoLTE communication with the second UE via the cellular network in a DRX mode with the initial DRX cycle length;
    sending a real-time transport control protocol (RTCP) sender report to the second UE;
    receiving an RTCP received report from the second UE in response to the RTCP sender report;
    estimating real-time transport protocol (RTP) end-to-end delay between the first UE and the second UE based on the RTCP received report;
    comparing the estimated RTP end-to-end delay with one or more delay thresholds;
    determining, based on said comparing, whether or not to modify DRX cycle length for the VoLTE call;
    if it is determined to modify DRX cycle length for the VoLTE call:
        providing an indication to the cellular network to modify DRX cycle length for the VoLTE call; and
        performing VoLTE communication with the second UE via the cellular network in the DRX mode according to a modified DRX cycle length, wherein performing VoLTE communication with the second UE via the cellular network in the DRX mode according to a modified DRX cycle length comprises aggregating a modified number of audio data frames at the RTP layer.

2. The method of claim 1, wherein comparing the estimated RTP end-to-end delay with one or more delay thresholds comprises comparing the estimated RTP end-to-end delay with each of a first delay threshold and a second delay threshold.

3. The method of claim 2, wherein determining whether or not to modify DRX cycle length for the VoLTE call comprises:
    determining to decrease DRX cycle length for the VoLTE call if the estimated RTP end-to-end delay is greater than the first delay threshold;
    determining to increase DRX cycle length for the VoLTE call if the estimated RTP end-to-end delay is less than the second delay threshold,
    wherein the first delay threshold is greater than the second delay threshold.

4. The method of claim 1, wherein estimating RTP end-to-end delay between the first UE and the second UE based on the received report comprises:
    subtracting a timestamp value corresponding to a time at which the first UE sends RTCP sender report to the second UE and a delay value corresponding to a delay between the second UE receiving the RTCP sender report and the second UE transmitting the RTCP received report from a timestamp value corresponding to a time at which the first UE receives the RTCP received report from the second UE to produce a round trip time value; and dividing the round trip time value by two to produce the estimated RTP end-to-end delay between the first UE and the second UE.

5. The method of claim 1,
wherein determining whether or not to modify DRX cycle length for the VoLTE call is further based on block error rate of the VoLTE communication with the second UE via the cellular network in the DRX mode with the initial DRX cycle length.

6. The method of claim 1,
wherein determining whether or not to modify DRX cycle length for the VoLTE call is further based on packet HARQ retransmission rate of the VoLTE communication with the second UE via the cellular network in the DRX mode with the initial DRX cycle length.

7. A non-transitory, computer accessible memory medium storing program instructions for a user equipment (UE) having a radio, wherein the program instructions are executable by a processor of the UE to:

establish a voice call via packet-switched cellular communication with a cellular network, wherein establishing the voice call comprises receiving an indication of an initial discontinuous reception (DRX) cycle length, and wherein the voice call comprises a voice-over long-term evolution (VoLTE) call;

communicate voice packets corresponding to the voice call with the cellular network in a DRX mode according to the initial DRX cycle length;

monitor one or more voice call quality indicators during the voice call;

determine to modify DRX cycle length based on comparing the one or more monitored voice call quality indicators to one or more call quality thresholds during the voice call;

provide an indication to the cellular network of a modified DRX cycle length; and communicate voice packets corresponding to the voice call with the cellular network in the DRX mode according to the modified DRX cycle length based on providing the indication to the cellular network to modify the DRX cycle length, wherein communicating voice packets corresponding to the voice call with the cellular network in the DRX mode according to the modified DRX cycle length comprises aggregating a modified number of audio data frames at a real-time transport protocol (RTP) layer.

8. The memory medium of claim 7, wherein the initial DRX cycle length is a maximum available DRX cycle length, wherein to determine to modify DRX cycle length, the program instructions are further executable by the processor of the UE to:

determine that call quality has decreased below a call quality threshold; and select a shorter DRX cycle length than the initial DRX cycle length as the modified DRX cycle length.

9. The memory medium of claim 7,
wherein the one or more voice call quality indicators comprise one or more of end-to-end delay, block error rate, or packet HARQ retransmission rate of cellular communications during the voice call.

10. The memory medium of claim 7,
wherein monitoring one or more voice call quality indicators comprises comparing end-to-end delay of the voice call with at least one delay threshold.

11. The memory medium of claim 7,
wherein monitoring one or more voice call quality indicators comprises comparing block error rate of cellular communications during the voice call with a block error rate threshold.

12. A first wireless user equipment (UE) device, comprising:

a radio; and a processing element operably coupled to the radio;

wherein the radio and the processing element are configured to:

establish a voice-over long-term evolution (VoLTE) call with a second UE via a cellular network;

receive an indication of an initial connected-mode discontinuous reception (C-DRX) cycle length for the VoLTE call from the cellular network;

initially communicate VoLTE call data with the cellular network in a C-DRX mode according to the initial C-DRX cycle length;

send a real-time transport control protocol (RTCP) sender report to the second UE;

receive an RTCP received report from the second UE in response to the RTCP sender report;

estimate end-to-end delay between respective real-time transport protocol (RTP) layers of the first UE and the second UE for the VoLTE call;

compare the end-to-end delay with one or more thresholds;

modify the C-DRX cycle length for the VoLTE call based on comparing the end-to-end delay with the one or more thresholds;

transmit an indication to the cellular network to modify the C-DRX cycle length; and communicate VoLTE call data with the cellular network in the C-DRX mode according to the modified C-DRX cycle length for the VoLTE call, wherein communicating VoLTE call data with the cellular network in the C-DRX mode according to the modified C-DRX cycle length for the VoLTE call comprises aggregating audio data frames at the RTP layer based on the modified C-DRX cycle length.

13. The first UE device of claim 12, wherein the radio and the processing element are further configured to:

decrease the C-DRX cycle length for the VoLTE call if end-to-end delay is greater than a first threshold.

14. The first UE device of claim 13, wherein the radio and the processing element are further configured to:

increase the C-DRX cycle length for the VoLTE call if end-to-end delay is less than a second threshold.

15. The first UE device of claim 12, wherein to modify a C-DRX cycle length for the VoLTE call, the radio and the processing element are further configured to:

receive an indication from the cellular network of a modified C-DRX cycle length.

16. The first UE device of claim 12,
wherein the VoLTE call comprises communication of audio packets each comprising audio data corresponding to a fixed length of time, wherein configurable C-DRX cycle lengths for the VoLTE call are integer multiples of the fixed length of time.

17. The first UE device of claim 16, wherein the fixed length of time is 20 ms, wherein configurable C-DRX cycle lengths comprise one or more of 20 ms, 40 ms, or 60 ms.

* * * * *